(12) United States Patent
Fraisse

(10) Patent No.: US 9,935,870 B2
(45) Date of Patent: Apr. 3, 2018

(54) CHANNEL SELECTION IN MULTI-CHANNEL SWITCHING NETWORK

(71) Applicant: Xilinx, Inc., San Jose, CA (US)

(72) Inventor: Henri Fraisse, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 148 days.

(21) Appl. No.: 14/995,839

(22) Filed: Jan. 14, 2016

(65) Prior Publication Data

US 2017/0207998 A1    Jul. 20, 2017

(51) Int. Cl.
*H04L 12/701*    (2013.01)
*H04L 12/707*    (2013.01)
*H04L 12/761*    (2013.01)
*H04L 12/933*    (2013.01)

(52) U.S. Cl.
CPC ............ *H04L 45/24* (2013.01); *H04L 45/16* (2013.01); *H04L 49/15* (2013.01)

(58) Field of Classification Search
CPC ............ G06F 17/5077; G07F 17/509; G07Q 10/08355; H01L 2027/11875
USPC .......................... 370/401–408; 438/129, 599
See application file for complete search history.

(56) References Cited

U.S. PATENT DOCUMENTS

| | | | |
|---|---|---|---|
| 6,951,005 B1 * | 9/2005 | Teig | G06F 17/5077 716/129 |
| 7,069,530 B1 * | 6/2006 | Teig | G06F 17/5077 716/129 |
| 7,187,672 B1 * | 3/2007 | Vishnu | H04L 49/10 340/2.28 |
| 7,306,977 B1 * | 12/2007 | Verma | G06F 17/5027 257/E21.575 |
| 7,308,198 B1 * | 12/2007 | Chudak | H04L 45/02 398/58 |
| 2008/0074142 A1 * | 3/2008 | Henderson | H03K 19/17732 326/41 |
| 2011/0188865 A1 * | 8/2011 | Lalonde | H04B 10/00 398/156 |

(Continued)

OTHER PUBLICATIONS

Edmonds, Jack, "Maximum Matching and a Polyhedron With O,1-Vertices," Journal of Research of the National Bureau of Standards—B. Mathematics and Mathematical Physics, Jan.-Jun. 1965, pp. 125-130,vol. 69B, Nos. 1 and 2, National Institute of Standards and Technology, Gaithersburg, Maryland, USA.

(Continued)

*Primary Examiner* — Andrew Chriss
*Assistant Examiner* — Lalita Pace
(74) *Attorney, Agent, or Firm* — LeRoy D. Maunu

(57) ABSTRACT

Methods and systems are disclosed for selecting channels for routing signals in a multi-channel switching network. In an example implementation, pairs of the signals that can be routed together over one channel in the multi-channel switching network are determined. A model graph is generated that has a respective vertex for each of the signals. The model graph also includes respective edges for the determined pairs connecting vertices corresponding to signals of the pair. A subset of the edges that includes a maximum number of disjoint edges is determined. Pairs of signals represented by the respective vertices connected by the edge are routed over a respective one of the channels. For vertices not connected to an edge in the subset, the signals represented by the vertices are routed via a respective one of the channels.

15 Claims, 8 Drawing Sheets

(56) References Cited

U.S. PATENT DOCUMENTS

2015/0104166 A1* 4/2015 Patel ................ H04Q 11/0066
398/5

OTHER PUBLICATIONS

Edmonds, Jack, "Paths, Trees, and Flowers," Canadian Journal of Mathematics, Jan. 1, 1965, pp. 449-467, vol. 1, Canadian Mathematical Society, Ottawa, Ontario, Canada.
McMurchie, Larry et al., "PathFinder: A Negotiation-Based Performance-Driven Router for FPGAs," Proceedings of the Third International ACM Symposium on Field-Programmable Gate Arrays, Feb. 12, 1995, pp. 111-117, IEEE, Piscataway, New Jersey, USA.
Wood, R. Glen, "FPGA Routing and Routability Estimation Via Boolean Satistiability," IEEE Transactions on Very Large Scale Integration (VLSI) Systems, Jun. 1998, pp. 222-231, vol. 6, No. 2, IEEE, Piscataway, New Jersey, USA.

* cited by examiner

CHANNEL SELECTION IN MULTI-CHANNEL SWITCHING NETWORK

TECHNICAL FIELD

The disclosure generally relates to multi-channel switching networks.

BACKGROUND

Programmable ICs are devices that can be programmed to perform specified logic functions. One type of programmable IC, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a circuit design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include one or more embedded processors that are capable of executing program code. A processor can be fabricated as part of the same die that includes the programmable logic circuitry and the programmable interconnect circuitry, which may also be referred to collectively as the "programmable circuitry" of the IC. It should be appreciated that execution of program code within a processor is distinguishable from "programming" or "configuring" the programmable circuitry that may be available on an IC. The act of programming or configuring the programmable circuitry of an IC results in the implementation of different physical circuitry as specified by the configuration data within the programmable circuitry.

SUMMARY

Various example implementations are directed to methods for selecting channels for routing of a plurality of signals in a multi-channel switching network. In an example implementation, pairs of the plurality of signals that can be routed together over one channel in the multi-channel switching network are determined. A model graph is generated that has respective vertices for the plurality of signals. The model graph also includes respective edges connecting vertices corresponding to signals of the pairs. A subset of the edges that includes a maximum number of disjoint edges is determined. For edges in the subset, respective channels in the multi-channel switching network are selected for routing both of the pair of signals represented by the respective vertices connected by the edge. For vertices in the graph that are not connected to an edge in the subset, a respective channel in the multi-channel switching network is selected for routing the signal represented by the vertex. A set of configuration data is generated and stored in a memory. The configuration data is configured to set the multi-channel switching network to route the plurality of signals using the selected channels.

In another example implementation, destination nodes for plurality of signals are determined. Pairs of the destination nodes to which signals cannot be routed to over one channel in the multi-channel switching network are determined. A model graph is generated that has respective vertices representative of the determined destination nodes. The model graph also has respective edges connecting vertices corresponding to the signals in the determined pairs. Vertices of the model graph are assigned to groups so that two vertices connected by an edge are in different groups. For one or more of the groups, signals are routed to the destination nodes corresponding to vertices assigned to the group via a respective channel in the multi-channel switching network.

A system is also disclosed for selecting channels for routing of a plurality of signals in a multi-channel switching network. The system includes a processor and a memory coupled to the processor. The memory is configured with a set of instructions that when executed by the processor cause the processor to perform a set of operations in response to a user defining a circuit design that is clocked by a plurality of signals generated by different clock sources of a programmable IC. The instructions cause the processor to select channels of a multi-channel switching network on the programmable IC for routing the signals. In selecting the channels, the processor determines pairs of the plurality of signals that can be routed together over one channel in the multi-channel switching network. The processor also generates a model graph in a memory coupled to the processing circuit. The model graph has respective vertices representative of signals and respective edges connecting vertices corresponding to the pairs of signals. The processor determines a subset of the edges that includes a maximum number of disjoint edges. Each disjoint edge connects two vertices that are not adjacent to any of the other disjoint edges. For edges in the subset, the processor selects a respective channel in the multi-channel switching network for routing the pair of signals represented by the respective vertices connected by the edge. For each vertex in the graph that is not connected to an edge in the subset, the processor selects a respective channel in the multi-channel switching network for routing the signal represented by the vertex. The instructions further cause the processor to generate and store a set of configuration data in the memory. When input to the programmable IC, the configuration data causes programmable resources in the programmable IC to implement the circuit design and set the multi-channel switching network on the programmable IC to route clock signals from the clock sources using the selected channels.

BRIEF DESCRIPTION OF THE DRAWINGS

Various aspects and features of the disclosed circuits and methods will become apparent upon review of the following detailed description and upon reference to the drawings in which.

DETAILED DESCRIPTION

In the following description, numerous specific details are set forth to provide a more thorough description of the specific embodiments. It should be apparent, however, to one skilled in the art, that one or more embodiments may be practiced without all the specific details given below. In other instances, well known features have not been described in detail so as not to obscure the one or more embodiments. For ease of illustration, the same number labels are used in different diagrams to refer to the same items, however, in alternative embodiments the items may be different.

Multi-channel switch networks may be used in various applications to route signals between a plurality of source nodes and a plurality of destination nodes. To provide increased flexibility, some programmable ICs include a multi-channel switching network that may be configured to route various data signals to different regions of a programmable IC. As an illustrative example, circuit designs often operate different sub-circuits in different clock domains in order to satisfy data rate requirements of the circuit design. A programmable IC may include a multi-channel switching network configured to route dock signals from any of a plurality of dock sources to different regions of a programmable IC.

Figure 1:
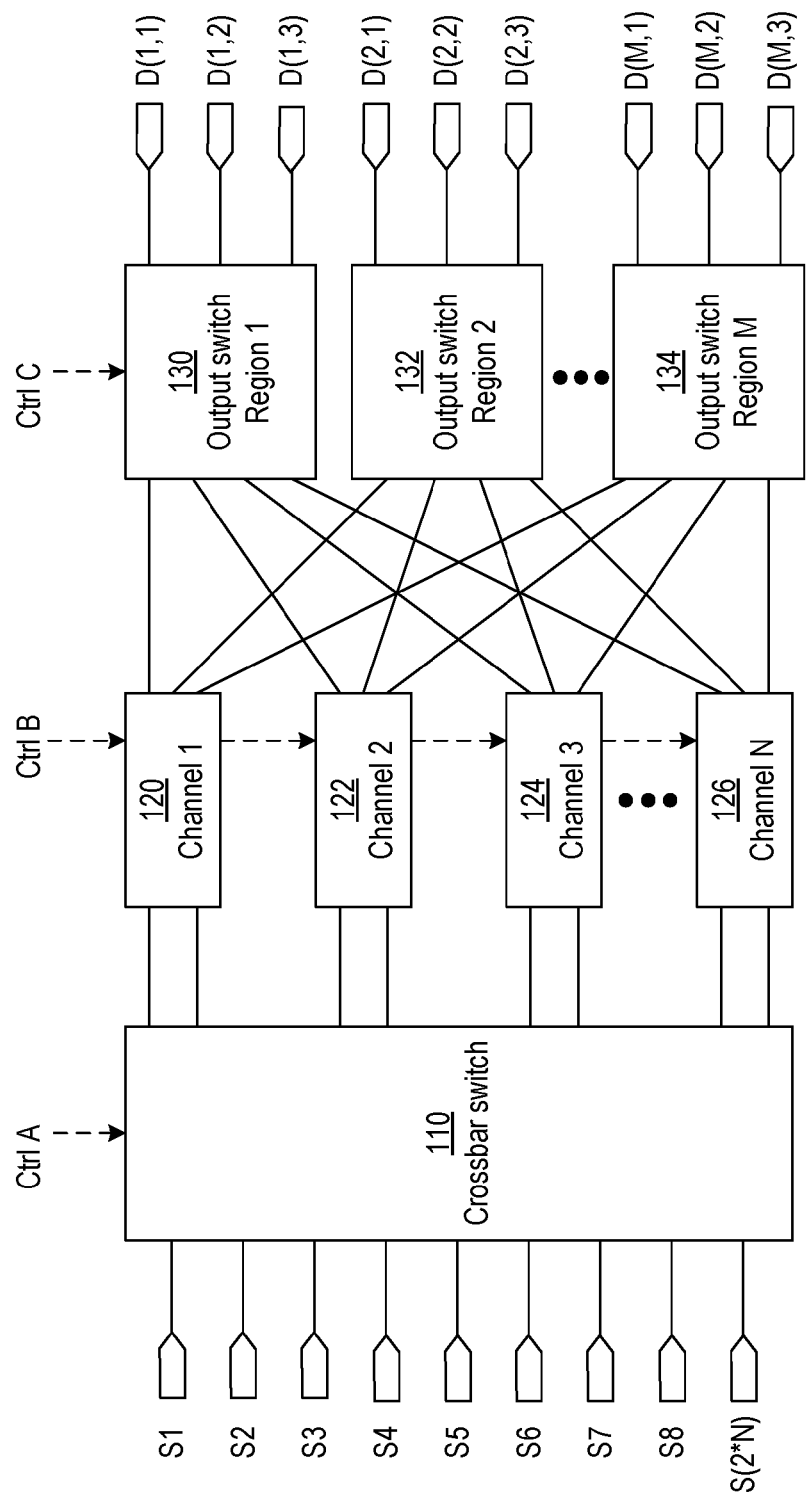
FIG. 1 shows an example multi-channel switching network that may be configured to route a set of data signals, using the disclosed processes.

FIG. 1 shows an example multi-channel switching network that may be configured to route a set of signals, using the disclosed processes. The multi-channel switching network 100 may be configured to route signals from a set of source nodes S1, S2, S3, S4, S5, S6, S7, S8, and S(2*N) to any of a set of destination nodes D(1,1), D(1,2), D(1,3), D(2,1), D(2,2), D(2,3), . . . , D(M,1), D(M,2), and D(M,3). In this example, the destination nodes are distributed in M local regions. In the identifier for each node, e.g., D(x,y), x indicates the region in which the destination node is located, and y uniquely identifies the destination node within the region.

The multi-channel switching network 100 includes a crossbar switch 110 that is configured to route signals from each of the source nodes to any input of a set of N channels 120, 122, 124, and 126. In this example, each channel includes two inputs. Each input is configured to receive a respective signal from the crossbar switch 110. In some implementations, each channel may include additional inputs for receiving signals from the crossbar switch 110. Each channel also includes M outputs each connected to route received signals to a respective ones of M regions. In some implementations, the multi-channel switching network 100 includes a respective output switch 130, 132, or 134 in each region. Each output switch 130, 132, or 134 is configured to route signals received from the channels 120, 122, 124, and 126 to a subset of the destination nodes D(1,1), D(1,2), D(1,3), D(2,1), D(2,2), D(2,3), . . . , D(M,1), D(M,2), and D(M,3) located in the region.

Each of the channels may simultaneously route multiple signals from respective inputs of the channel to respective regions. However, a channel may not include a sufficient number of connections to each output switch to route multiple signals to the same region. For instance, in the example multi-channel switching network 100, each channel 120, 122, 124, and 126 is connected to each output switch 130, 132, or 134 by a single signal line. Accordingly, the channel can only be used to route a pair of signals if the signals are routed to different output switches. If two signals are to be routed to destination nodes in the same region, the pair of signals would need to be routed via separate channels. Due to such restrictions, assignment of channels for routing of signals in a multi-channel switching network can be very computationally expensive.

Figure 2:
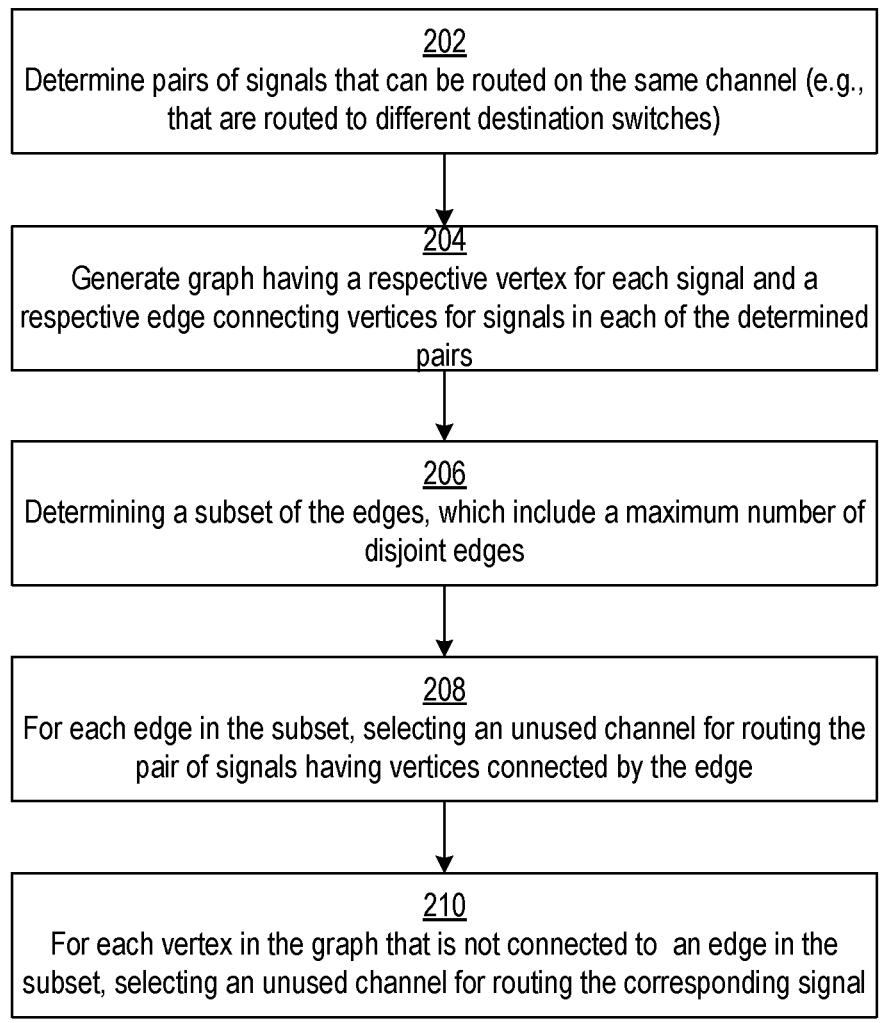
FIG. 2 shows a first process for selecting channels for routing signals in a multi-channel switching network.

Methods are disclosed for efficient selection of channels for routing signals in a multi-channel switching network. As described in more detail with reference to TABLE 2, the disclosed processes are select channels for routing of signals in less processing time in comparison to previous approaches. FIG. 2 shows a first process for selecting channels for routing signals in a multi-channel switching network. At block 202, pairs of signals that can be routed on the same channel are determined (e.g., signals to be routed to different output switches). At block 204, a model graph is generated in a memory. The graph that includes a respective vertex for each signal to be routed via the multi-channel switching network. For each of the determined pairs, the graph also includes a respective edge connecting vertices in the graph corresponding to signals of the pair. At block 206, a subset of the edges that includes a maximum number of disjoint edges is determined. For each edge in the subset, at block 208 an unused channel is selected for routing signals corresponding to vertices connected by the edge. For each vertex in the graph that is not connected to an edge in the subset, at block 210 an unused channel is selected for routing the signal.

Figure 3:
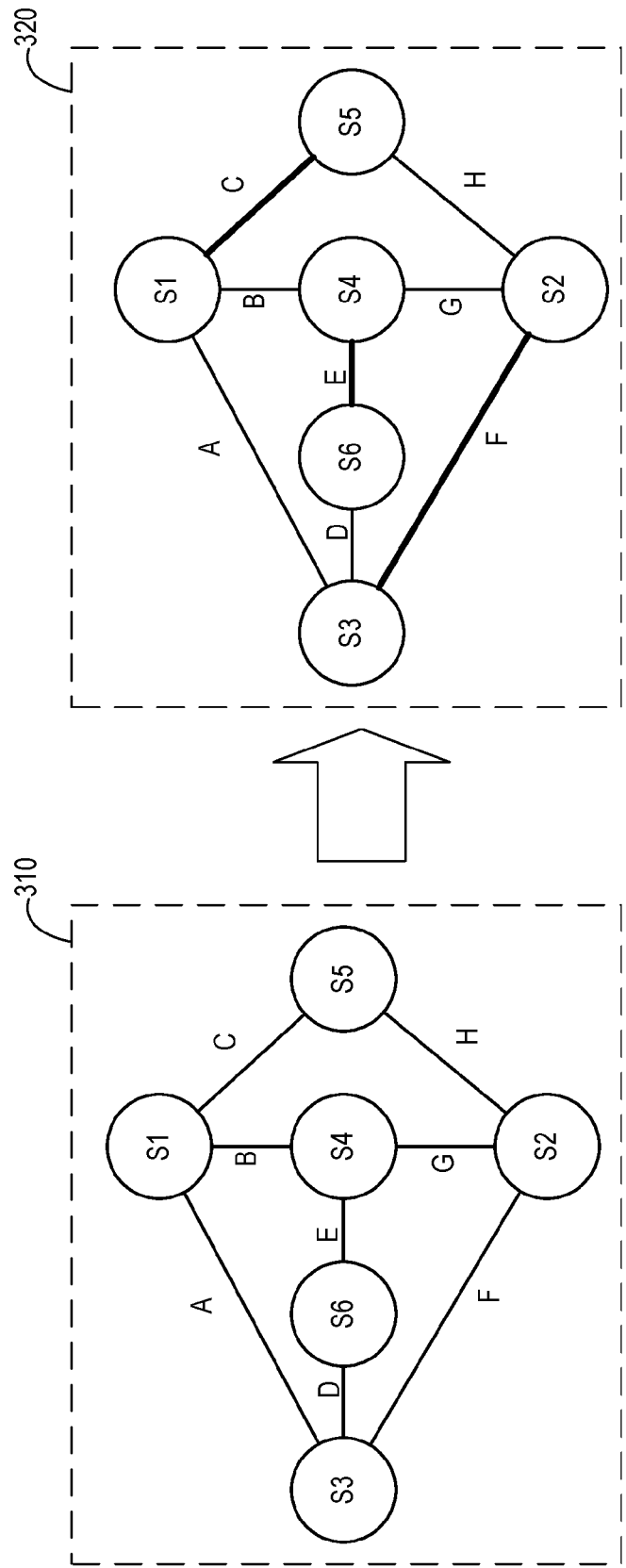
FIG. 3 shows an example graph generated by the process shown in FIG. 2.

FIG. 3 shows an example graph generated by the process in FIG. 2 for routing signals between the source and destination nodes listed in TABLE 1. FIG. 3 shows a first graph 310 that may be generated at block 204 in FIG. 2. The graph 310 includes a plurality of vertices, each representing a respective signal to be routed from one of the source nodes S1, S2, S3, S4, S5, S6, S7, S8, and S(2*N) in FIG. 1. The graph 310 also includes edges A, B, C, D, E, F, G, and H, which connect vertices for pairs of signals that can be routed together via the same channel. In this example, a pair of signals cannot be routed via the same channel if the destination nodes are coupled to the same output switch. For example, the signal from S1 to D(1, 1) cannot be routed with signals from S2 or S6 which also have destination nodes D(1, 2) and D(1, 3) connected to output switch 1. Conversely the signal from S1 to D(1, 1) can be routed with signals from S3, S4, and S5, which do not have a destination node connected to output switch 1. Accordingly, the graph includes edges A, B, and C to connect vertex for node 51 to vertices for nodes S3, S4, and S5. A second graph 320 has the vertices and edges of graph 310 with a maximum number of disjoint edges {C, E, F} highlighted. Alternatively, subsets {D, B, H}, {A, E, H} and {D, G, G} also include a maximum number of disjoint edges in the graph.

TABLE 1

| Source node | Destination node(s) |
| --- | --- |
| SN1 | DN(1, 1) |
| SN2 | DN(1, 2) |
| SN3 | DN(2, 1) |
| SN4 | DN(2, 2) |
| SN5 | DN(2, 3); DN(3, 1) |
| SN6 | DN(1, 3); DN(3, 2) |

The subset having a maximum number of disjoint edges may be determined using various processes. In some implementations, the subset may be determined using a maximum matching algorithm such as the Edmonds Blossom Algorithm. Example 1 shows pseudocode that describes a process for determining a maximum number of disjoint edges in a model graph based on the Edmonds Blossom Algorithm. The pseudocode starts with a first phase that quickly collects a set of disjoint edges that constitute a maximal matching. A maximal matching is a set of disjoint edges such that it is not possible to add any more disjoint edge to it. The maximal matching is a local optimal solution but not necessarily a global one. In contrast, a maximum matching solution includes the maximum number of disjoint edges out of all combinations of disjoint edges in the graph. A maximum matching solution is a global optimal solution. A maximal matching solution may be found by adding disjoint edges of the graph to the solution until every edge in the graph is adjacent to an edge in the subset. Two edges are adjacent if they are connected to the same vertex.

After finding a maximal matching, the pseudocode checks iteratively the existence of a so called "augmented path" to see if a better solution exists. An augmented path is available if the graph includes a pair of vertices that are not connected to any edges in the current solution, such that the two vertices can be connected together through a path in the graph made of edges that are alternatively outside and inside the current solution. For example, the list of vertices (s, n1, n2, n3, n4, t) is an augmented path if the pair of vertices (s, t) are not connected to any edge of the solution and if there is two edges of the solution connecting respectively the pair of vertices (n1, n2) and (n3, n4) and three edges not in the solution connecting the pair of vertices (s, n1), (n2, n3) and (n4, t). A new maximal solution is obtained from the augmenting path by removing the two edges connecting (n1, n2) and (n3, n4) from the solution and by adding the three edges connecting the vertices (s, n1), (n2, n3), (n4, t) to the solution. After this operation, the current solution contains exactly one more edge than before. The pseudocode repeats in this manner until no more augmented paths can be found in the graph. It is guaranteed that then, the solution contains a maximum number of disjoint edges. For additional information regarding the Edmonds Blossom Algorithm, reference may be made to Edmonds, Jack "Paths, trees, and flowers". *Canad. J. Math.* 17: 449-467 (1965).

EXAMPLE 1

```
// Find a maximal matching solution
solution = empty_set;
while a disjoint edge e from solution exist in the graph {
    Add e to the solution
}
// Increase iteratively the maximal matching to become maximum
matching while an augmented path can be found in the current solution {
    switch the edges of the augmented path to increase by one
    the current maximal matching solution;
}
```

Figure 4:
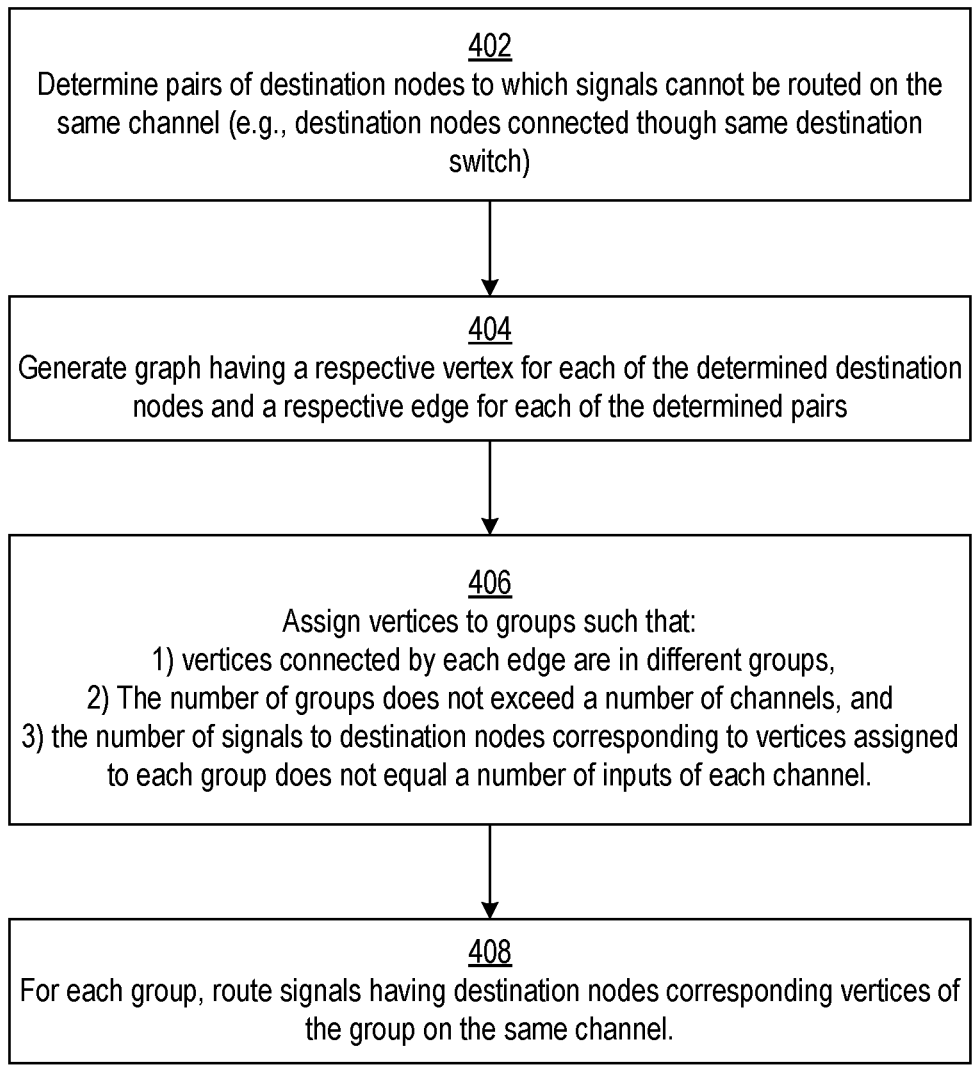
FIG. 4 shows a second process for selecting channels for routing signals in a multi-channel switching network.

FIG. 4 shows a second process for determining routes for signals in a multi-channel switching network. At block 402, pairs of destination nodes to which signals cannot be routed on the same channel are determined. At block 404, a graph is logically constructed that includes a respective vertex for each destination node of the signals. The graph also includes a respective edge for each of the determined pairs of destination nodes to which signals cannot be routed together. At block 406, vertices are grouped into color groups by assigning colors to vertices in the graph. The vertices are grouped so that:

1) the edges only connect vertices in different color groups;
2) the number of color groups does not exceed the number of channels; and
3) the number of signals to destination nodes corresponding to the vertices in each color group does not exceed the number of inputs of each channel.

The vertices may be assigned to color groups, for example using a Boolean satisfiability algorithm. At block 408, for each color group, signals having destination nodes corresponding to vertices of the color group are assigned to the same channel for routing. For ease of explanation, the grouping process is described with reference to groups identified by color. However, groups may be identified using various other identifiers (e.g., numbers or letters). For instance, at block 406 vertices may be grouped by assigning group numbers to vertices in the graph.

Figure 5:
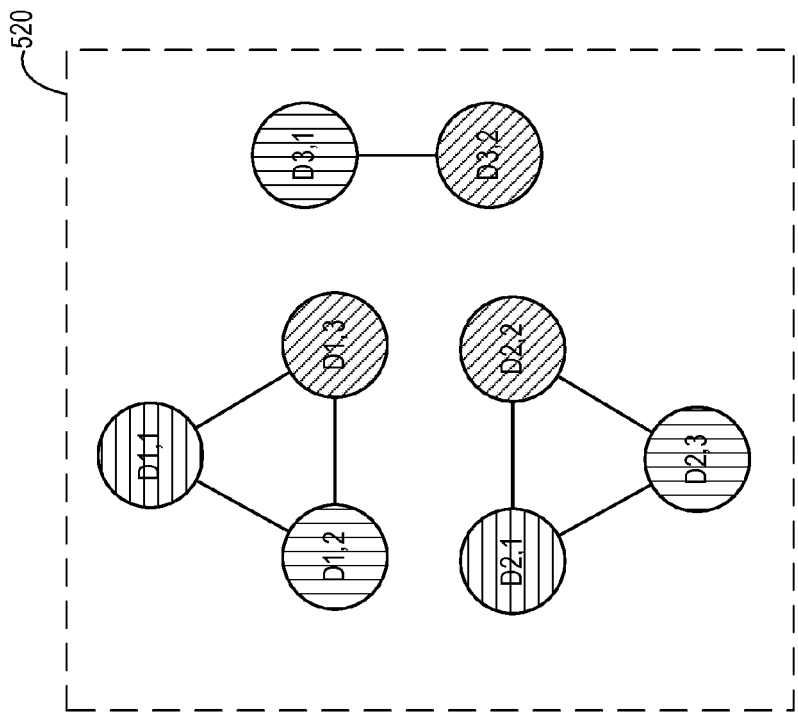
FIG. 5 shows an example graph generated by the process shown in FIG. 4.
Figure 5:
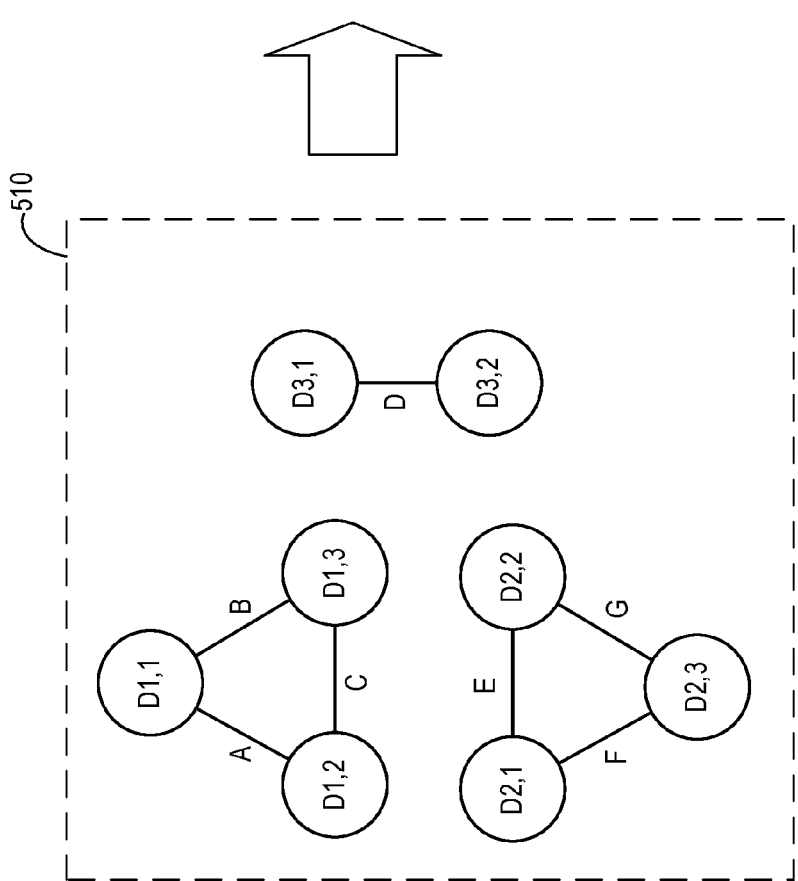

FIG. 5 shows an example graph generated by the process shown in FIG. 4 for routing signals between the source and destination nodes listed in TABLE 1. A first graph 510 may be generated at block 404 in FIG. 4. The graph 510 includes a plurality of vertices representing destination nodes of the signals to be routed. The graph 510 also includes edges A, B, C, D, E, F, and G, which connect vertices for pairs of destination nodes to which signals cannot be routed via the same channel. As described with reference to FIG. 1, a pair of signals cannot be routed via the same channel if the destination nodes are coupled to the same output switch.

A second graph 520 has each vertex assigned to one color group of a set of three color groups. The vertex is assigned to a color group if the vertex satisfies the criteria discussed with reference to FIG. 4. In this example, the assignment of vertices to color groups assumes that the multi-channel switch network includes at least three channels, each having at least two inputs. In this example, vertices for destination nodes D(1,1) and D(2,1) are assigned to a first color group represented by horizontal lines. Vertices for destination nodes D(1,2), D(2,3), and D(3,1) are assigned to a second color group represented by vertical lines. Vertices for destination nodes D(1,3), D(2,2), and D(3,2) are assigned to a second color group represented by slanted lines. As discussed with reference to FIG. 4, signals to destination nodes represented by vertices in the same color group may be routed over the same channel.

The processes shown in FIGS. 2 and 4 for selecting channels for routing signals in a multi-channel switching network require fewer computing resources (e.g., processing time and/or processing circuits) in comparison to previous approaches, TABLE 2 illustrates performance of the disclosed processes along with performance of a previous satisfiability (SAT) based routing process. The performance results were acquired by routing 53 test designs using a SAT based routing process, the process shown in FIG. 2, and the process shown in FIG. 4. The routing of these 53 test designs required determining routing solutions for a total of 1848 routing problems. As shown in TABLE 2, the previous SAT based routing process failed to determine valid routing solutions for 20 routing problems corresponding to 12 of the test designs. In contrast, the processes shown in FIGS. 2 and 4 each identified valid routing solutions for all 1848 routing problems. The SAT based routing process took 1614.0 seconds of processing time. In comparison, the process shown in FIG. 2 took only 2.8 seconds to solve the routing problems. The process shown in FIG. 2 took only 37.61 seconds. Accordingly, the disclosed processes require fewer computing resources in comparison to the previous SAT based routing approach.

TABLE 2

|  | SAT process | FIG. 2 process | FIG. 4 process |
| --- | --- | --- | --- |
| Total # of designs | 53 | 53 | 53 |
| # of unsolved designs | 12 | 0 | 0 |
| # of routing problems | 1848 | 1848 | 1848 |
| # of unsolved routing problems | 20 | 0 | 0 |
| Cumulative runtime (sec) | 1614.08 | 2.08 | 37.61 |

Although the process shown in FIG. 2 is faster than the process shown in FIG. 4, the process of FIG. 4 may be preferable in some instances. For instance, the process shown in FIG. 2 is optimized for use in a multi-channel switching network, in which each channel has two inputs for receiving signals. In contrast, the process shown in FIG. 4 can provide optimal channel assignment for channels having any number of inputs. Furthermore, the process shown in FIG. 2 assigns each signal to exactly one channel but there are some situations where the optimal solution can be obtained only if some of the signals are split between multiple channels. For example, TABLE 3 describes a problem with 3 signals SN1; SN2, SN3 to route such that no pair of signals can be routed together on the same channel. In this case, the process shown in FIG. 2 requires 3 channels to route the three signals, while the process of FIG. 4 requires only two channels, because it can route the destination node DN(2,1) of signal SN1 with the signal SN3 and the other destination node DN(1, 1) of signal SN1 with the signal SN2.

TABLE 3

| Source node | Destination node(s) |
| --- | --- |
| SN1 | DN(1, 1); DN(2, 1) |
| SN2 | DN(1, 2); DN(3, 1) |
| SN3 | DN(2, 2); DN(3, 2) |

In some implementations, a system may be configured to initially perform the process shown in FIG. 2. If the process of FIG. 2 does not identify valid channel assignment, the system may determine a channel assignment using the process shown in FIG. 4.

Figure 6:
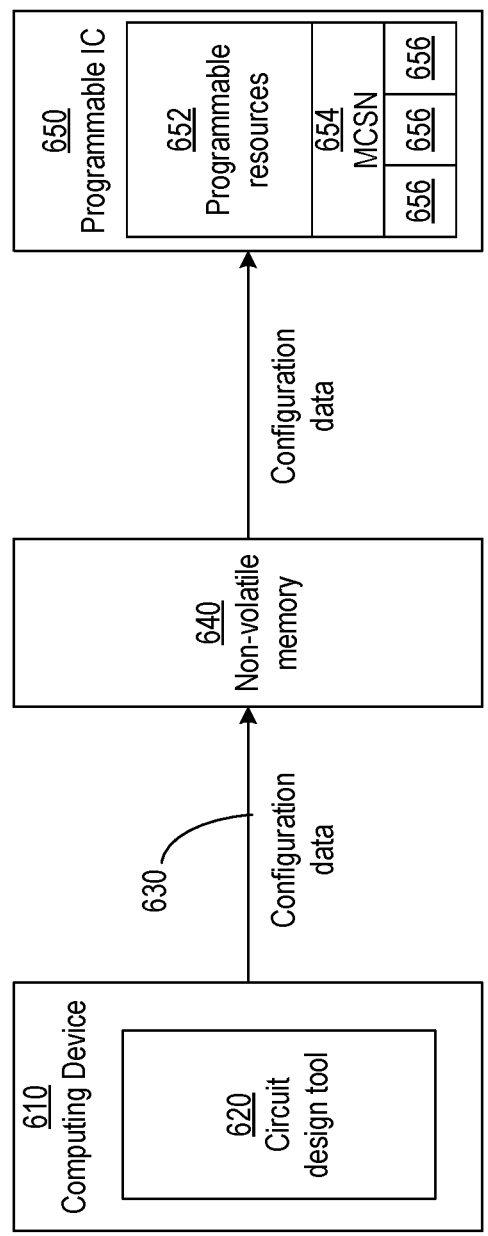
FIG. 6 shows an example system, consistent with one or more implementations.

FIG. 6 shows an example system, consistent with one or more implementations. The system includes a computing arrangement 610 configured to execute software that provides a circuit design tool 620 for creation of circuit designs to be implemented on a programmable IC 650. The programmable IC 650 includes a set of programmable resources 652 that may be programmed to implement circuits specified in a circuit design. The programmable IC 650 includes a plurality of clock sources 656 that may be used to clock different portions of the circuit design. The programmable IC 650 also includes multichannel switching network 654 configured to route clock signals generated by each of the clock sources 656 to various destinations in the programmable resources. The multi-channel switching network 654 may be implemented, for example, using the multi-channel switching network shown in FIG. 1

The circuit design tool 620 provides a graphical user interface (GUI) having interface elements for a user to specify the circuit design and select clock sources 656 to be used to clock different circuits in the circuit design. The circuit design tool 620 is configured to determine channel assignment for routing clock signals generated by the selected clock sources to circuits of the circuit design that use the clock signals. The channel assignment may be performed, for example, using the processes shown in FIG. 2 or 4.

The circuit design tool 620 generates a set of configuration data 630 that causes programmable resources 652 to implement circuitry specified in the circuit design. The configuration data is also configured to cause the multi-channel switching network to route the clock signals generated by the selected clock sources using the determined channel assignment. The generated set of configuration data 630 is stored in a non-volatile memory 640 coupled to the programmable IC 650. When the programmable IC is powered on, the configuration data 630 is retrieved from the non-volatile memory 640 and used to configure the programmable resources 652 and multi-channel switching network 654 as previously described.

Figure 7:
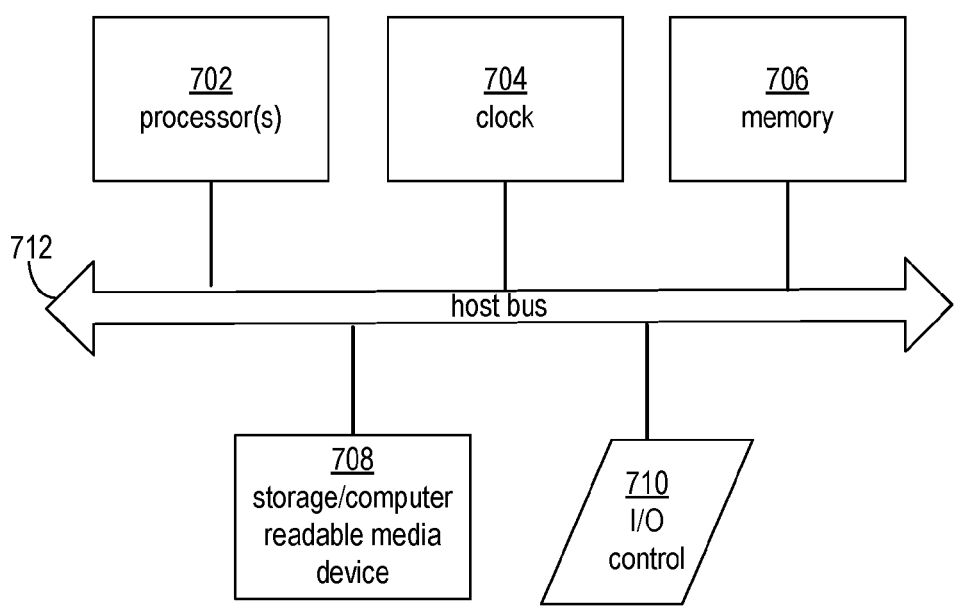
FIG. 7 shows a block diagram of an example computing arrangement that may be configured to implement the data structures and processes described herein.

FIG. 7 shows a block diagram of an example computing arrangement that may be configured to implement the data structures and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 700 includes one or more processors 702, a clock signal generator 704, a memory arrangement 706, a storage arrangement 708, and an input/output control unit 710, all coupled to a host bus 712. The arrangement 700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 702 may be one or more general purpose processors, or a combination of one or more general purpose processors and suitable co-processors, or one or more specialized processors (e.g., RISC, CISC, pipelined, etc.).

The memory arrangement 706 typically includes multiple levels of cache memory, and a main memory. The storage arrangement 708 may include local and/or remote persistent storage, such as provided by magnetic disks (not shown), flash, EPROM, or other non-volatile data storage. The storage unit may be read or read/write capable. Further, the memory arrangement 706 and storage arrangement 708 may be combined in a single arrangement.

The processor(s) 702 executes the software in storage arrangement 708 and/or memory arrangement 706, reads data from and stores data to the storage arrangement 708 and/or memory arrangement 706, and communicates with external devices through the input/output control arrangement 710. These functions are synchronized by the clock signal generator 704. The resource of the computing arrangement may be managed by either an operating system (not shown), or a hardware control unit (not shown).

Figure 8:
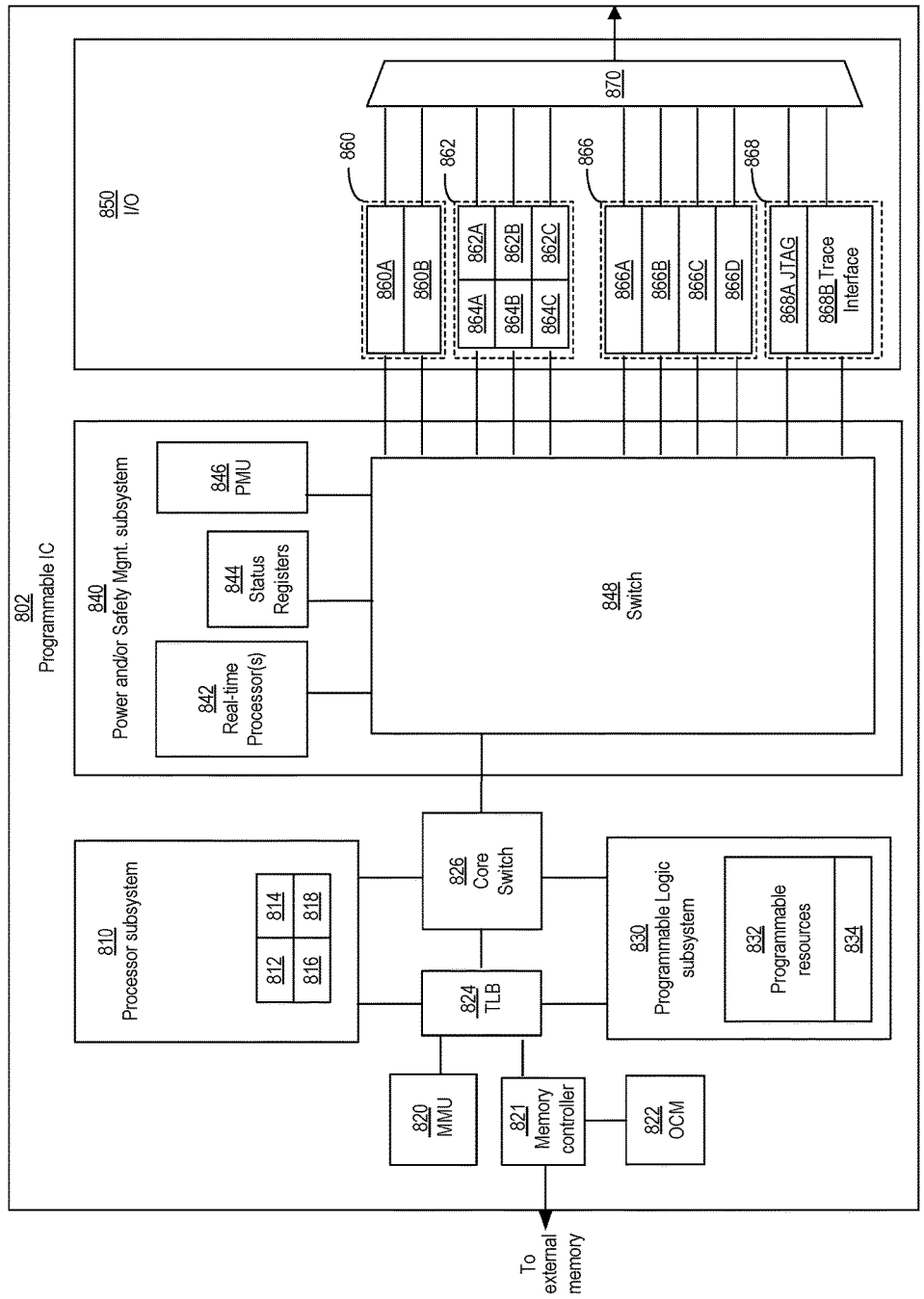
FIG. 8 shows a programmable IC that may be configured in accordance with one or more implementations.

FIG. 8 shows a programmable IC 802 that may be configured in accordance with one or more implementations. The programmable IC may also be referred to as a System On Chip (SOC), which includes a processor subsystem 810 and a programmable logic subsystem 830. The processor subsystem 810 may be programmed to implement a software portion of the user design, via execution of a user program. The program may be specified as part of a configuration data stream or may be retrieved from an on-chip or off-chip data storage device. The processor subsystem 810 may include various circuits 812, 814, 816, and 818 for executing one or more software programs. The circuits 812, 814, 816, and 818 may include, for example, one or more processor cores, floating point units (FPUs), an interrupt processing unit, on chip-memory, memory caches, and/or cache coherent interconnect.

The programmable logic subsystem 830 of the programmable IC 802 may be programmed to implement a hardware portion of a user design. For instance, the programmable logic subsystem may include a number of programmable resources 832, which may be programmed to implement a set of circuits specified in a configuration data stream. The programmable resources 832 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 832 may be programmed by loading a configuration data stream into the configuration memory cells, which define how the programmable interconnect circuits and programmable logic circuits are configured. The collective states of the individual memory cells then determine the function of the programmable resources 832. The configuration data can be read from memory (e.g., from an external PROM) or written into the programmable IC 802 by an external device. In some implementations, configuration data may be loaded into configuration memory cells by a configuration controller 834 included in the programmable logic subsystem 830. In some other implementations, the configuration data may be loaded into the configuration memory cells by a start-up process executed by the processor subsystem 810.

The programmable IC 802 may include various circuits to interconnect the processor subsystem 810 with circuitry implemented within the programmable logic subsystem 830. In this example, the programmable IC 802 includes a core switch 826 that can route data signals between various data ports of the processor subsystem 810 and the programmable logic subsystem 830. The core switch 826 may also route data signals between either of the programmable logic or processing subsystems 810 and 830 and various other circuits of the programmable IC, such as an internal data bus. Alternatively or additionally, the processor subsystem 810 may include an interface to directly connect with the programmable logic subsystem—bypassing the core switch 826. Such an interface may be implemented, for example, using the AMBA AXI Protocol Specification (AXI) as published by ARM.

In some implementations, the processor subsystem 810 and the programmable logic subsystem 830 may also read or write to memory locations of an on-chip memory 822 or off-chip memory (not shown) via memory controller 821. The memory controller 821 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 821 is able to communicate is provided for purposes of illustration only and is not intended as a limitation or to be exhaustive. As shown in FIG. 8, the programmable IC 802 may include a memory management unit 820 and translation look-aside buffer 824 to translate virtual memory addresses used by the subsystems 810 and 830 to physical memory addresses used by the memory controller 821 to access specific memory locations.

The programmable IC may include an input/output (I/O) subsystem 850 for communication of data with external circuits. The I/O subsystem 850 may include various types of I/O devices or interfaces including for example, flash memory type I/O devices, higher performance I/O devices, lower performance interfaces, debugging I/O devices, and/or RAM I/O devices.

The I/O subsystem 850 may include one or more flash memory interfaces 860 illustrated as 860A and 860B. For example, one or more of flash memory interfaces 860 can be implemented as a Quad-Serial Peripheral Interface (QSPI) configured for 4-bit communication. One or more of flash memory interfaces 860 can be implemented as a parallel 8-bit NOR/SRAM type of interface. One or more of flash memory interfaces 860 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 850 can include one or more interfaces 862 providing a higher level of performance than flash memory interfaces 860. Each of interfaces 862A-862C can be coupled to a DMA controller 864A-864C respectively. For example, one or more of interfaces 862 can be implemented as a Universal Serial Bus (USB) type of interface. One or more of interfaces 862 can be implemented as a gigabit Ethernet type of interface. One or more of interfaces 862 can be implemented as a Secure Digital (SD) type of interface.

The I/O subsystem 850 may also include one or more interfaces 866 such as interfaces 866A-866D that provide a lower level of performance than interfaces 862. For example, one or more of interfaces 866 can be implemented as a General Purpose I/O (GPIO) type of interface. One or more of interfaces 866 can be implemented as a Universal Asynchronous Receiver/Transmitter (UART) type of interface. One or more of interfaces 866 can be implemented in the form of a Serial Peripheral Interface (SPI) bus type of interface. One or more of interfaces 866 can be implemented in the form of a Controller-Area-Network (CAN) type of interface and/or an I²C type of interface. One or more of interfaces 866 also can be implemented in the form of a timer type of interface.

The I/O subsystem 850 can include one or more debug interfaces 868 such as processor JTAG (PJTAG) interface 868A and a trace interface 868B. PJTAG interface 868A can provide an external debug interface for the programmable IC 802. Trace interface 868B can provide a port to receive debug, e.g., trace, information from the processor subsystem 810 or the programmable logic subsystem 830.

As shown, each of interfaces 860, 862, 866, and 868 can be coupled to a multiplexer 870. Multiplexer 870 provides a plurality of outputs that can be directly routed or coupled to external pins of the programmable IC 802, e.g., balls of the package within which the programmable IC 802 is disposed. For example, I/O pins of programmable IC 802 can be shared among interfaces 860, 862, 866, and 868. A user can configure multiplexer 870, via a configuration data stream to select which of interfaces 860-868 are to be used and, therefore, coupled to I/O pins of programmable IC 802 via multiplexer 870. The I/O subsystem 850, may also include a fabric multiplexer I/O (FMIO) interface (not shown) to connect interfaces 862-868 to programmable logic circuits of the programmable logic subsystem. Additionally or alternatively, the programmable logic subsystem 830 can be configured to implement one or more I/O circuits within programmable logic. In some implementations, the programmable IC 802 may also include a subsystem 840 having various circuits for power and/or safety management. For example, the subsystem 840 may include a power management unit 846 configured to monitor and maintain one or more voltage domains used to power the various subsystems of the programmable IC 802. In some implementations, the power management unit 846 may disable power of individual subsystems, when idle, to reduce power consumption, without disabling power to subsystems in use.

The subsystem 840 may also include safety circuits to monitor the status of the subsystems to ensure correct operation. For instance, the subsystem 840 may include one or more real-time processors 842 configured to monitor the status of the various subsystems (e.g., as indicated in status registers 844). The real-time processors 842 may be configured to perform a number of tasks in response to detecting errors. For example, for some errors, the real-time processors 842 may generate an alert in response to detecting an error. As another example, the real-time processors 842 may reset a subsystem to attempt to restore the subsystem to correct operation. The subsystem 840 includes a switch network 848 that may be used to interconnect various subsystems. For example, the switch network 848 may be configured to connect the various subsystems 810, 830, and 840 to various interfaces of the I/O subsystem 850. In some applications, the switch network 848 may also be used to isolate the real-time processors 842 from the subsystems that are to be monitored. Such isolation may be required by certain application standards (e.g., IEC-61508 SIL3 or ISO-26262 standards) to ensure that the real-time processors 842 are not affected by errors that occur in other subsystems.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

The methods and circuits are thought to be applicable to a variety of systems and applications. Other aspects and features will be apparent to those skilled in the art from consideration of the specification. For example, though aspects and features may in some cases be described in individual figures, it will be appreciated that features from one figure can be combined with features of another figure even though the combination is not explicitly shown or explicitly described as a combination. It is intended that the specification and drawings be considered as examples only, with a true scope of the invention being indicated by the following claims.

What is claimed is:

1. A method for selection of channels for routing of a plurality of signals in a multi-channel switching network, comprising:
executing on a processor circuit operations including:
determining pairs of the plurality of signals that can be routed together over one channel in the multi-channel switching network;
generating a model graph in a memory coupled to the processor circuit, the model graph including a plurality of vertices and a plurality of edges, each vertex representing one of the plurality of signals and each edge connecting vertices that represent the signals of one of the pairs;
determining a subset of the edges that includes a maximum number of disjoint edges, each disjoint edge connecting two vertices that are not adjacent to any of the other disjoint edges;
for each edge in the subset, selecting a channel in the multi-channel switching network for routing the pair of signals represented by the vertices connected by the edge;
for vertices in the graph that are not connected to an edge in the subset, selecting a respective channel in the multi-channel switching network for routing the signal represented by the vertex; and
generating and storing a set of configuration data in a configuration memory, wherein the configuration data is configured to set the multi-channel switching network to route the plurality of signals using the selected channels.

2. The method of claim 1, wherein the multi-channel switching network includes a plurality of channels, a crossbar switch, and a plurality of output switches, and the method further comprising:
using the crossbar switch, routing signals from a plurality of source nodes to the plurality of channels;
using the plurality of channels, routing signals from the crossbar switch to the plurality of output switches; and
for each of the plurality of output switches, routing signals from the plurality of channels to a respective set of destination nodes.

3. The method of claim 2, wherein the determining pairs of the plurality of signals that can be routed over the same channel in the multi-channel switching network includes determining pairs of signals that are to be routed to respective sets of destination nodes for different ones of the plurality of output switches.

4. The method of claim 2, further comprising, using one of the plurality of channels, simultaneously routing a plurality of signals from the crossbar switch to the plurality of output switches.

5. The method of claim 1, wherein the multi-channel switching network is a clock network.

6. The method of claim 1, further comprising:
determining destination nodes for the plurality of signals;
determining pairs of the destination nodes that signals cannot be routed to over the same channel in the multi-channel switching network;
generating a second model graph having a vertex representative of each of the determined destination nodes and an edge connecting vertices in each of the determined pairs of destination nodes;
assigning the vertices of the second model graph to groups so that vertices connected by each edge are a different group; and
for each of the groups, routing signals to the destination nodes corresponding to vertices assigned to the group via a respective channel in the multi-channel switching network.

7. The method of claim 6, wherein the number of groups is less than or equal to the number of channels in the multi-channel switching network.

8. The method of claim 6, wherein the number of signals to destination nodes corresponding to the vertices assigned to each group is less than or equal to the number of inputs for each channel in the multi-channel switching network.

9. A system, comprising:
a processor; and
a memory coupled to the processor, the memory configured with a set of instructions that when executed by the processor cause the processor to:
in response to a user defining a circuit design that is clocked by a plurality of signals generated by different clock sources of a programmable IC, select channels of a multi-channel switching network on the programmable IC for routing the signals by performing operations including:
determining pairs of the plurality of signals that can be routed together over one channel in the multi-channel switching network;
generating a model graph in a memory coupled to the processor, the model graph including a plurality of vertices and a plurality of edges, each vertex representative of one of the signals and each edge connecting vertices that represent the signals of one of the pairs;
determining a subset of the edges that includes a maximum number of disjoint edges, each disjoint edge connecting two vertices that are not adjacent to any of the other disjoint edges;
for each edge in the subset, selecting a channel in the multi-channel switching network for routing the pair of signals represented by the vertices connected by the edge; and
for vertices in the graph that are not connected to an edge in the subset, selecting a respective channel in the multi-channel switching network for routing the signal represented by the vertex; and
generate and store a set of configuration data in the memory, wherein the configuration data is configured to, when input to the programmable IC, cause programmable resources in the programmable IC to implement the circuit design and set the multi-channel switching network to route clock signals from the clock sources using the selected channels.

10. The system of claim 9, further comprising:
a non-volatile memory coupled to the processor;
the programmable IC, which is coupled to the non-volatile memory; and
wherein the instructions further cause the processor to store the set of configuration data in the non-volatile memory; and
wherein the programmable IC is configured to retrieve the set of configuration data from the non-volatile memory in response to being powered on.

11. The system of claim 10, wherein the multi-channel switching network on the programmable IC includes,
a plurality of channels;
a crossbar switch configured to route the signals from a plurality of source nodes, coupled to the clock sources on the programmable IC, to the plurality of channels; and
a plurality of output switches, each configured to route signals from the plurality of channels to a respective set of destination nodes.

12. The system of claim 11, wherein the determining of the pairs of the plurality of signals that can be routed over the same channel in the multi-channel switching network includes determining pairs of signals that are to be routed to respective sets of destination nodes For different ones of the plurality or output switches.

13. The system of claim 9, further comprising:
determining destination nodes for the plurality of signals;
determining pairs of the destination nodes that signals cannot be routed to over the same channel in the multi-channel switching network;
generating a second model graph having a vertex representative of each of the determined destination nodes and an edge connecting vertices corresponding to signals in each of the determined pairs of destination nodes;
assigning the vertices of the second model graph to groups so that vertices connected by each edge are a different group; and
for one or more of the groups, routing signals to the destination nodes corresponding to vertices assigned to the group via a respective channel in the multi-channel switching network.

14. The system of claim 13, wherein the number of groups is less than or equal to the number of channels.

15. The system of claim 13, wherein the number of signals to destination nodes corresponding to the vertices assigned to each group is less than or equal to the number of inputs for each channel.

* * * * *